June 30, 1936. B. W. TWYMAN 2,045,811
STEERING GEAR
Filed March 18, 1933 2 Sheets—Sheet 1
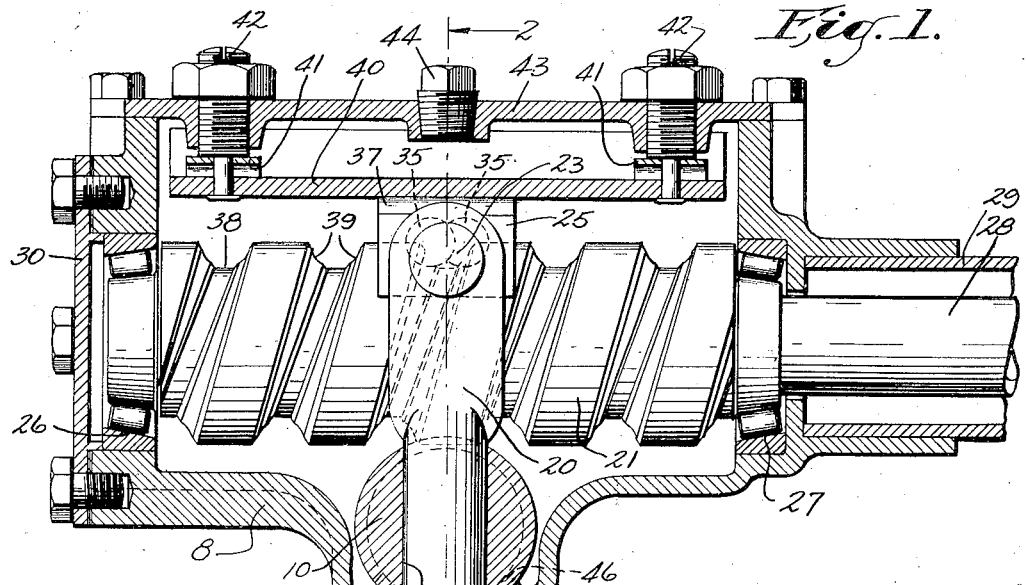
Fig. 1.
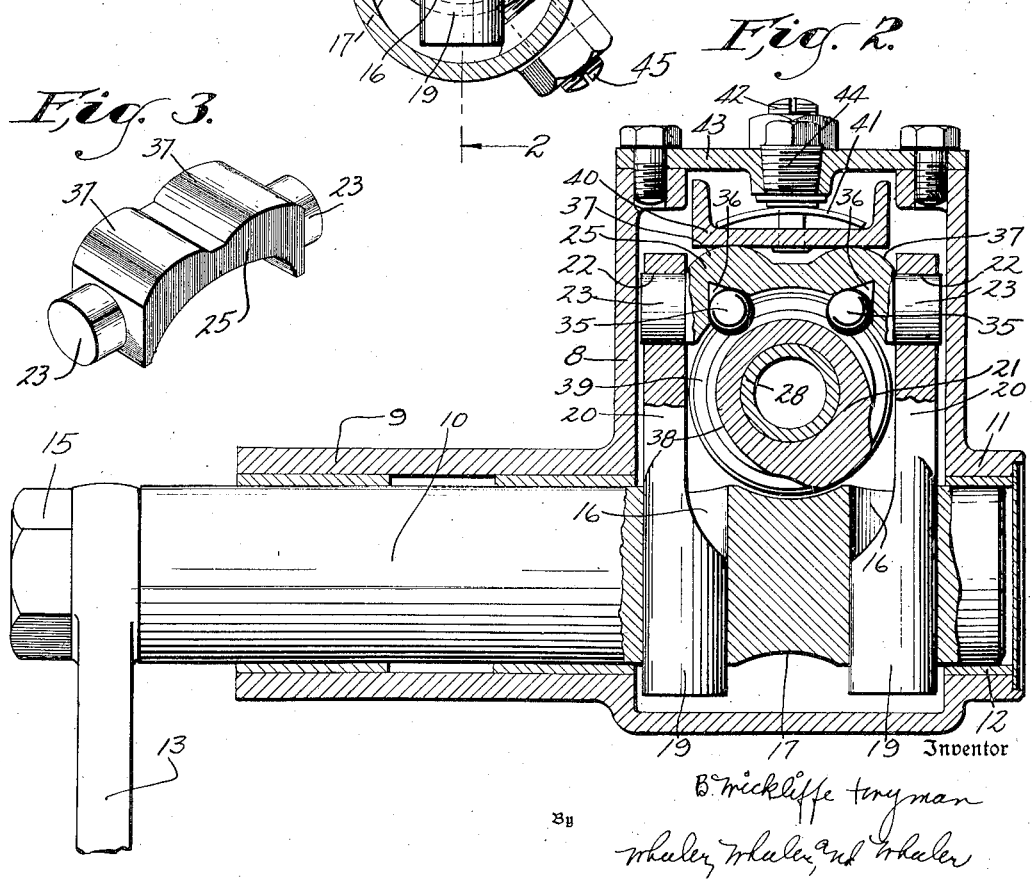
Fig. 3.
Fig. 2.
Inventor
B. Wickliffe Twyman
By Whaley, Whaley, and Whaley
Attorneys

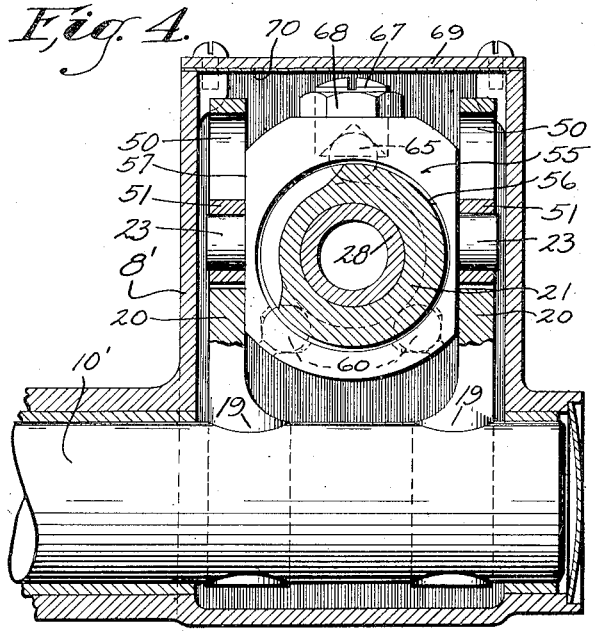
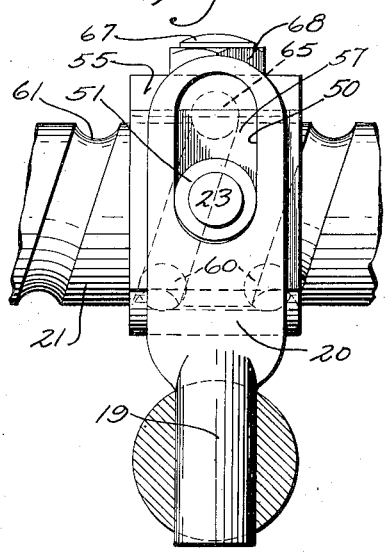
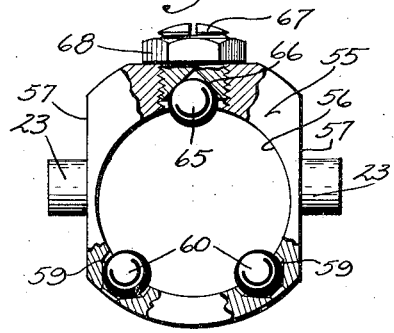
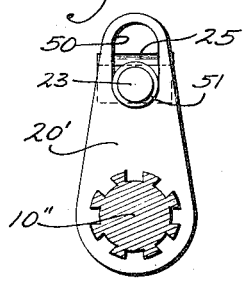
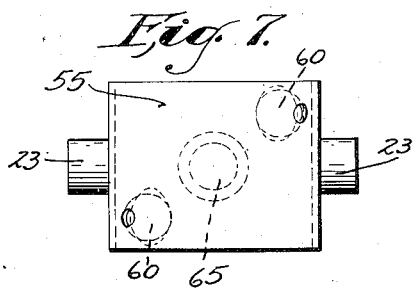

Patented June 30, 1936

2,045,811

UNITED STATES PATENT OFFICE 2,045,811

STEERING GEAR

B. Wickliffe Twyman, Indianapolis, Ind., assignor to Lavine Gear Company, Milwaukee, Wis., a corporation of Wisconsin Application March 18, 1933, Serial No. 661,481

3 Claims. (Cl. 74—499)

This invention relates to improvements in steering gears.

The objects of the invention include:

First,—an improvement in operation through the elimination of friction, through an increase in the amount of "camming action" for a given size of gear, whereby to give easier control of the vehicle on corners.

Secondly,—a reduction in size attributable to a novel and extremely compact assembly of the worm cam and rock shaft, and an entirely new set of motion transmitting connections between these parts.

Thirdly,—an important and drastic reduction in cost. The improved design herein disclosed makes it possible to use a one-piece case of such simple form that it may be made with a sand core, thereby cutting the cost of the castings from six and seven cents per pound to four cents per pound, or less. The compactness of the gear organization, and the reduction in weight of the casing wall resulting from the improved design, effects a further saving of approximately one half the metal used in casings for previous gears of comparable power. The improved design involves little or no milling of the case and very much less machining of other parts than has been required in gears hitherto known. Ordinary shafting, instead of a special forging, is used for the rock shaft.

In the drawings:

Figure 1 is a view of the gear as it appears when the case is cut upon a longitudinal section.

Figure 2 is a transverse section taken in the plane indicated at 2—2 in Figure 1.

Figure 3 is a perspective view in detail of the nut segment.

Figure 4 is a view similar to Figure 2 showing a preferred embodiment of the invention.

Figure 5 is a fragmentary section similar to Figure 1 showing the modified embodiment illustrated in Figure 4.

Figure 6 is a detail of the cam follower used in the preferred device and illustrated partially in end elevation and partially in various sections through the several ball sockets.

Figure 7 is an inverted plan view of the cam follower shown in Figures 4 to 6.

Figure 8 is a fragmentary detail in transverse section through the rock shaft illustrating in side elevation a brake applied thereto.

Figure 9 is a fragmentary side elevation of a modified form of rocker arm.

Like parts are identified by the same reference characters throughout the several views.

The gear casing 8 comprises an extremely light-weight casting which, because of its simplicity, may be cored with sand and inexpensively produced. At 9 it is provided with an integral sleeve comprising a bearing for the rock shaft 10. At 11 an integral collar receives a bushing 12 for the other end of said shaft. The steering arm 13 is fastened by means of nut 15 to the end of shaft 10 which projects from the casing.

It will be noted that shaft 10 is not a forging, but a simple bar of shafting. The portion thereof which operates within the casing 8 is provided with transverse bores 16 and an intervening peripheral groove 17. The bores slidably receive the cylindrical posts 19 of the yoke arms 20 which extend upwardly at opposite sides of the worm cam 21 and have registering bearings at 22 for the trunnions 23 of the nut segment 25.

The worm cam or screw 21 is provided in the usual manner with anti-friction bearings fitted within the case 8 at 26 and 27. It is tubular to receive connection with the steering shaft 28 extending through the steering column 29. A closure plate 30 covers an opening in the gear casing sufficiently large to permit introduction of the worm cam 21 into the gear casing.

Instead of threading the nut segment 25 to mesh with the thread of the worm cam 21, I prefer to make the connection between these parts through balls 35 which are seated in conical recesses 36 in the worm cam opposite from the transverse axis of the device, as shown in Figure 1, to mesh with the worm cam at opposite sides of its center line. The thread of the worm cam is, in this embodiment, preferably so formed as to provide a relatively deep helical groove at 38, the margins of the land between consecutive turns of the groove having relatively narrow bearing surfaces at 39, between which the balls engage. These surfaces and the conical walls of the nut segment 25 engaged by the balls are preferably drawn at about 35 degrees from the radius of the worm cam which passes through the axis of the ball.

The fact that the surfaces of the worm cam are opposed, diametrically of each ball, by surfaces of the nut segment of parallel angularity, tends to provide axes upon which the ball will freely rotate during manipulation of the gear.

Obviously the thrust of the worm cam upon the balls will tend to force the nut segment 25 radially away from the cam. To define the path of operation of the nut segment, and to maintain the parts subject to a constant degree of pressure, I employ a piece of channel iron 40 supported by compression springs 41 and adjusted by screws 42 as a bearing plate. The area of bearing contact between the nut segment 25 and the bearing plate 40 is preferably limited, and free access of grease is permitted, by forming the nut segment to provide on its upper surface two cylindrical sectors 37, as clearly shown in Figs. 2 and 3.

Thus, all portions of the bearing are readily accessible to lubricant contained within the casing, and clearance is provided for the ends of the screws 42. The bearing surface of the under face of the channel iron requires no treatment except buffing to place it in condition for use. The bearing guide parts are assembled on a removable cover plate 43, in which there is a grease hole closed by plug 44.

In order to eliminate the necessity for any end thrust bearings in the rocker arm 10, which is not peculiarly subject to end thrust in the present gear design, I may employ the screw 45 which has a round terminal portion 46 bearing in the peripheral groove 17 of the rock shaft and thereby to restrict the rock shaft from movement in either direction.

In steering gears for special purposes it may be desirable to brake frictionally the movement of the rock shaft, and in such structures a rock shaft 10a may have a groove 17a of such form as to receive a brake shoe 47 connected with the set screw 45a, as shown in Fig. 8, to perform the dual function of braking and positioning the rock shaft.

In some types of steering gears there is no occasion for the brake herein disclosed because the gear offers sufficient resistance to the rotation of the worm cam to hold the wheels in any given adjustment as the vehicle turns a corner. The result is desirable in tractors, road scrapers, and the like, which move slowly and in which the operator may have many functions other than the steering to care for. The present gear operates so smoothly and easily, however, that the camber of the vehicle wheels powerfully tends to straighten the wheels after they have been set for rounding a corner. It is desirable in this gear to have the braking force applied to the rock shaft rather than to the worm cam, and it is particularly desirable to be able to control or wholly to eliminate the braking action when required.

The gearing already described represents a great advance from the standpoint of operation and economy. The gear disclosed in Figs. 4 to 7 and now to be described, represents a further advance, using some of the same features above disclosed, but incorporating improvements making for greater ease of operation and reduced cost of manufacture.

In the preferred embodiment of the invention all strains on the casing are centered at the shaft bearings therein. Not only does the cam follower or nut take its position entirely from the worm cam but, in addition, the end thrust of the rock shaft is entirely absorbed in the worm cam. Consequently, the walls of the gear casing 8' are further reduced in thickness and the casing is simplified in construction.

The rock shaft 10' is similar to that shown at 10 in Figs. 1 to 3 but, being somewhat lower in the casing, it need not be grooved at 17 to accommodate the worm cam and it does not require positioning against axial movement.

As the construction above described, the rock shaft 10' is transversely bored at 16 to receive the cylindrical posts 19 of arms 20 which project upwardly at each side of the worm cam 21 in closely spaced relation thereto. In this embodiment of the invention, however, the posts 19 are not slidably fitted to the transverse bores 16 of the rock shaft. They may be pressed into place by hand or otherwise secured, the strains thereon in a vertical direction being sufficiently light so that a hand pressed fit is adequate to position them. Since no sliding fit is required, one item of expense in the previous gear is reduced. The arms 20 might be forged integrally with the rock shaft 10' for the purposes of this embodiment of the invention, but for the fact that the construction disclosed is much cheaper and equally effective.

Due to the fact that the arms 20 swing through an arc about the axis of the rock shaft, and due to the fact that the movement of the cam follower or nut is rectilinear on a tangent to that arc, it is necessary to provide for relative movement between the cam follower and the arms 20, as a substitute for the bodily movement of the arms with respect to the rock shaft which was provided for by the sliding of posts 19 in bores 16 in the previously described embodiment of the invention.

Accordingly, the arms 20 in the present device are bifurcated or slotted at 50 and the trunnions 23 carry rollers 51 which serve as anti-friction bearing means interposed between the trunnions and the portions of arms 20 at each side of the slot. Of course, the slot provides sufficient clearance for the roller so that the roller does not simultaneously contact both sides thereof. It is a noteworthy fact that because the arms 20 do not move with respect to the rock shaft 10', the wide part of the arms can be extended very close to the rock shaft, thereby giving added strength.

The cam follower 55 is distinctly different from that disclosed in Figs. 1 and 2. It comprises a block of metal such as may be formed from a section of bar stock having an eccentric hole at 56 of such diameter as completely to clear the worm cam 21. The cam follower block 55 is continuous about the worm cam. The trunnions 23 are integral therewith and are formed by cutting away a portion of the original stock to provide bearing surfaces at 57 against which the inner faces of arms 20 are engaged. While it is not at all essential to the invention that the cam follower be made from bar stock as described, it has been found that the possibility of making it from such stock is a considerable factor in reducing its cost.

Equidistant from a vertical plane including the axis of the worm cam 21, are sockets 59 which receive balls 60 meshing with the thread of the worm cam. In practice it has been found desirable to place these sockets at about 45 degrees outwardly from said plane. Of course the sockets are axially offset from each other for a distance corresponding to the pitch of the thread of the worm cam. It may be mentioned also that, in contradistinction to the worm cam shown in Fig. 1, the present cam is preferably made with a round bottomed groove which, except for the usual tolerances, corresponds to the contour of the balls 60. Thus, each ball engages the bottom of the cam groove 61 instead of riding on spaced bearing surfaces of the cam thread as in the previously described embodiment of the invention.

Symmetrically disposed between the balls 60, in the median plane aforesaid and on the top of the block portion 55 of the cam follower, is a ball 65 meshing with the worm cam or screw and seated in a socket 66 in an adjusting screw 67, which is preferably provided with a lock nut at 68. The disposition of the ball 65 in screw 67 is a very important feature of the invention, and the arrangement of three balls, all meshing with a single turn of the worm cam at symmetrically spaced points, gives a balanced engagement of the cam follower with the worm cam.

It has been found to be desirable that the axis of trunnions 23 should be exactly midway between the center of ball 65 and a line connecting the centers of balls 60. Where three balls are used the axis of trunnions 23 will be slightly above the axis of the worm cam, but a study of the forces involved will disclose the fact that this arrangement is desirable in order that the thrust exerted on the several balls may be equalized about the axis of the trunnions. But for the arrangement shown, the total force transmitted from the worm cam to the cam follower would be transmitted through a ball or balls less than the total number of balls provided.

Since all strains are handled by the bearing portions of the casing, it is no longer necessary to provide any slide bearing structure at the top of the casing. A plain sheet metal cover 69 is screwed down upon a cork gasket 70, thus making the casing oil tight without any milling operation thereon. Although the use of the slotted arms requires a somewhat greater spacing between the axis of the worm cam and the axis of the rock shaft than is required in the Fig. 1 construction, the loss in compactness is fully compensated by the elimination of the slide bearing at the top of the casing, and the net result is a casing which is approximately the identical size of that disclosed in Figs. 1 and 2, the weight being slightly less.

Fig. 9 represents a slight further modification which is included merely by way of exemplifying a different connection between rocker arms 20' and a rocker shaft 10'', the parts being splined together. The arm 20' is bifurcated or slotted at 50, as in the construction shown in Figs. 4 and 5. Either type of cam follower 25 or 55 may be used, the trunnions 23 being equipped with rollers 51 to move with little friction in slot 50.

The steering gears herein disclosed are exceptionally free of frictional resistance and are believed to operate more easily than any gear previously made. While balls have been suggested heretofore as a means of transmitting motion from a worm cam to a follower or nut, the balanced application of pressure in accordance with the constructions herein disclosed are exceptionally efficient. The division of thrust between peripherally spaced balls is a large factor in the observed efficiency, and the disposition of the surfaces with which the balls bear is also an important consideration.

For so compact a gear, the ease of operation is also very substantially enhanced by the wide angle through which the rocker arm moves. In sharply turning a corner, the operator of a vehicle rotates his worm cam to substantially its limit of movement. In this position of the parts the thrust developed in the rocker arms is not only effective at a greater radial distance from the axis of the rock shaft, thus increasing the moment of levarage, but, in addition, the thrust includes a wedging or camming operation whereby the operator is given the advantage of a leverage or moment which is considerably increased in proportion to the increased ratio between the steering shaft movement and the rock shaft movement.

Thus, in the improved gears herein disclosed, the operator has a very noteworthy mechanical advantage in resisting the tendency of the wheel camber to reduce the deflection of the wheels.

While the extent to which the operation of the gear is improved can only be fully appreciated by using the gear, those skilled in the art will readily recognize the factors which reduce cost, such as the simplified form of the one piece casing, the elimination of all milling machine work on the case, the use of ordinary shafting instead of a forging for the rock shaft, the substitution of symmetrically balanced balls for an expensive female thread on the cam follower, the elimination of end thrust bearings from the rock shaft and, in general, the reduction in hand labor and machining.

I claim:

1. A steering gear comprising the combination with a casing having rock shaft bearings in its opposite sides adjacent its bottom, having worm cam bearings in its ends and having an open top provided with a closure plate, of a rock shaft oscillatable in said rock shaft bearings and having no portion within said casing larger than one of said bearings through which said shaft projects, said rock shaft having axially spaced transverse bores between said bearings, a pair of spaced arms having base portions socketed in the respective bores of the rock shaft and receivable therein through the open top of said casing, said arms being bifurcated, aligned trunnions engaged in the bifurcations of said arms, trunnion carrier means movable axially from said worm cam bearings, a worm cam mounted in said bearings between said arms, and cam follower means meshing with said worm cam and so disposed symmetrically about said trunnion carrier means that the resultant line of thrust of the worm cam thereon will be intersected by the axis of the aligned trunnions.

2. In a steering gear, the combination with a one piece casing member open at its top and provided in opposite sides adjacent its bottom with rock shaft bearings and provided at its ends with worm cam bearings, of a rock shaft in said rock shaft bearings having no portion within said casing exceeding the diameter of one of said bearings, through which said rock shaft projects and through which it may be inserted and withdrawn, said rock shaft having transverse bores between its bearings, posts receivable in said bores through the open top of said casing member and having mutually spaced bearing surfaces provided with openings, a cam follower confined between said bearing surfaces and provided with trunnion means operatively bearing in said openings, a worm cam engaged in said cam follower, said cam follower and worm cam having peripherally spaced points of engagement providing a line of thrust intersected by a line connecting the axes of said trunnion means, and a closure for said casing member.

3. In a steering gear, the combination with the peripherally grooved rock shaft, of a brake shoe positioned in the groove of said rock shaft, and means fixing the position of said shoe, whereby to offer a predetermined resistance to the rotation of said shaft while fixing the axial position thereof.

B. WICKLIFFE TWYMAN.